March 20, 1962 E. E. ETTERMAN 3,026,113
DRY CLEANING LIQUID SEAL
Filed March 19, 1959
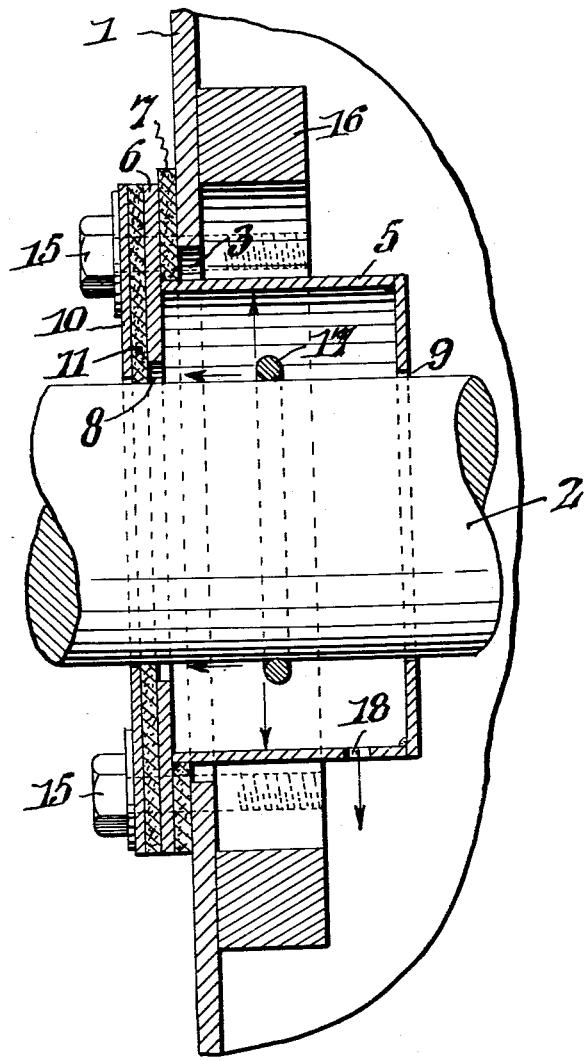
INVENTOR.
*Edwin Edward Etterman,*
BY *Paul & Paul*
ATTORNEYS.

United States Patent Office 3,026,113
Patented Mar. 20, 1962

3,026,113
DRY CLEANING LIQUID SEAL
Edwin E. Etterman, Bowling Green, Ky., assignor to Detrex Chemical Industries, Inc., Detroit, Mich., a corporation of Michigan
Filed Mar. 19, 1959, Ser. No. 800,460
3 Claims. (Cl. 277—4)

This invention relates to shaft sealing means, that is to say, to means for preventing vapors as well as liquid splashed, sprayed or deposited in any manner other than under head, upon a shaft revolving in an enclosure, from escaping to the exterior of the enclosure, as for example, the drum shaft of a dry cleaning machine of a type disclosed in U.S. Patent 2,574,251 granted to Clarence F. Dinley on November 6, 1951. It has been the general practice heretofore to seal such shafts by means of packing compressed into bearings by glands drawn tightly into the bearings as shown in the Dinley patent. These bearings and the packing glands had to be accurately machined and assembled and, moreover, had to be tightened from time to time to compensate for wear and to prevent leakage through them.

My invention has as its chief aim to obviate the above mentioned drawbacks characteristic of gland-packed shaft sealing bearings. This objective is realized in practice, as hereinafter more fully disclosed, through provision of a sealing means which is of simple and less expensive construction; which is more readily accessible for repair or replacement; and which imposes little or no restraint against free rotation of the shaft with which it is used.

In connection with a sealing means having the above attributes, it is a further aim of my invention to provide equally simple means for arresting the escape of vapors formed within the shaft enclosure when the seal application is against volatile liquids such as are used in dry cleaning.

Other objects and attendant advantages will appear from the following detailed description of the attached drawing, the FIGURE of which is a fragmentary view in section showing a shaft sealing means conveniently embodying my invention.

With more detailed reference to the drawing, the numeral 1 designates a side wall of a casing which, for example, may be that of a dry cleaning machine of a type disclosed in the Dinley patent hereinbefore referred to; and the numeral 2 designates the horizontal shaft of the rotary drum (not illustrated) of the machine. Fixedly set into a relatively large opening 3 in the casing wall 1 is a small box-like cylindrical housing 5 having, at one end, a flange 6 between which and the outer face of said wall, a gasket 7 of felt or the like is interposed. As shown, the shaft 2 extends to the exterior of the end wall 1 of the machine casing with slight clearance all around through circular openings 8 and 9 respectively in the opposite end walls of the housing. In turn, interposed between the flange 6 of the housing 5 and an annular retaining plate 10 is an annular gasket 11 likewise of felt or the like, said gasket having an axial orifice through which the shaft 2 passes with a tight fit. A plurality of annularly-spaced cap screws 15 with their shanks penetrating the flange 6 of the housing, the two gaskets 7, 11 and the machine casing wall 1 and threadedly engaged into a relatively heavy ring 16 welded or otherwise permanently attached to the outer face of said wall, are relied upon to rigidly hold the housing 5 in place. The housing 5 may be formed as a casting, or it may be made up from parts fashioned from relatively stiff plate metal united by welding at the regions of mutual abutment as conventionally shown in the drawing.

In order to prevent the escape of liquid collecting on the shaft 2 during operation of the machine and disposing of it before it can reach the vapor sealing gasket 11, I have further provided a means including a collar 17 which embraces the shaft with a snug fit within the housing 5. This collar may be in the form of an O ring of rubber or the like, a flat or otherwise shaped ring of materials such as cork or leather capable of tightly gripping the shaft, or it may be simply of steel or other metal pressed upon the shaft or secured to the shaft by set screws. As the shaft 2 rotates, it will be seen that liquid collecting thereon and tending to creep along the shaft in the direction indicated by the arrows in the drawing, will be intercepted by the collar 17 and flung off to the inside periphery of the housing 5, the accumulation thus caught draining back into the machine through an aperture 18 in the bottom of said housing. Especial attention is directed to the fact that the aperture 18 in the housing 5 is laterally offset relative to that side of the collar 17 by which the liquid moving along the shaft as above explained, is intercepted, the liquid being thereby positively prevented from reaching the vapor sealing gasket 11 as will be readily understood.

My invention is not to be considered as limited in its application to the particular dry cleaning machine shown in the drawings. While, in accordance with the provisions of the statutes, I have illustrated and described the best forms of embodiment of my invention now known to me, it will be apparent to those skilled in the art that changes may be made in the form of the apparatus described without departing from the spirit and scope of the invention as set forth in the appended claims, and that in some cases certain features of my invention may be used to advantage without a corresponding use of other features.

Having thus described my invention, I claim:

1. In a drycleaning machine having a rotary drum shaft extending into the interior of the machine casing, a seal to prevent the escape of fluid from said machine about said shaft comprising a hollow, generally circular, box-like housing set into a circular opening of larger diameter than said housing formed in a side wall of said casing and arranged to extend beyond the side wall of said casing into the interior of said machine and spaced to provide an annular space between said housing and said side wall, said housing having circular openings formed in the opposite ends thereof for the passage of said shaft with slight clearance thereabout, whereby an annular space is provided between said shaft and said housing, said housing having a flange formed at an end thereof outside said casing wall, said flange being arranged to abut a flexible sealing gasket interposed between said flange and the outer face of said side wall, said gasket being arranged concentrically to said housing and in circumferential contact therewith, thereby sealing said annular space between said housing and said side wall and allowing yielding movement of said housing within said circular opening, another flexible sealing gasket disposed adjacent the outer face of said flange of said housing and arranged concentrically to and in circumferential contact with said shaft, thereby sealing said annular space between said shaft and said housing and providing yielding support for said shaft, an annular retaining plate arranged to abut said second-mentioned sealing gasket and maintain said gasket adjacent said flange and means attached to said side wall of said casing for securing said retaining plate, said first and second-mentioned gasket and said housing in the respective relative positions thereof.

2. In a dry cleaning machine having a rotary drum shaft extending into the interior of the machine casing, said shaft having formed thereon inside said casing, a collar adapted to arrest the flow of liquid along said shaft, a seal to prevent the escape of fluid from said machine about said shaft comprising a hollow, generally circular, box-like housing arranged to encompass said collar on said shaft and set into a circular opening of larger diameter than said housing formed in a side wall of said casing, said housing being arranged to extend beyond the side wall of said casing into the interior of said machine and spaced to provide an annular space between said housing and said side wall, said housing having circular openings of larger diameter than said shaft formed in the opposite ends thereof for the passage of said shaft and an aperture at the bottom thereof disposed inwardly of said collar for the draining of fluid from said housing into the interior of said casing, said shaft being arranged in said openings of said housing to provide an annular space between said housing and said shaft, said housing having a flange formed at an end thereof outside said casing wall, said flange being arranged to abut a flexible sealing gasket interposed between said flange and the outer space of said side wall, said gasket being arranged concentrically to said housing and in circumferential contact therewith, thereby sealing said annular space between said housing and said side walls and allowing yielding movement of said housing within said circular opening, another flexible sealing gasket disposed adjacent the outer face of said flange of said housing and arranged concentrically to and in circumferential contact with said shaft, thereby sealing said annular space between said shaft and said housing and providing yielding support for said shaft, an annular retaining plate having an axial opening through which the shaft passes with slight circumferential clearance and arranged to abut said second-mentioned sealing gasket and maintain said gasket adjacent said flange and a plurality of annularly arranged cap screws having the shanks thereof passing through said retaining plate, the flange of said housing and said first and second-mentioned gaskets and arranged for securing said housing to said side wall of said machine casing.

3. The seal defined in claim 2, wherein a heavy metal ring is welded to the inside face of said side wall of said casing and wherein the shanks of said cap screws are threaded into said metal ring.

References Cited in the file of this patent
UNITED STATES PATENTS

| | | |
|---|---|---|
| 1,207,759 | Huff | Dec. 12, 1916 |
| 1,469,731 | Page | Oct. 2, 1923 |
| 2,248,405 | Freeman | July 8, 1941 |
| 2,522,993 | Coffey | Sept. 19, 1950 |
| 2,574,251 | Dinley | Nov. 6, 1951 |